United States Patent [19]

Grover

[11] 4,408,325
[45] Oct. 4, 1983

[54] TRANSMITTING ADDITIONAL SIGNALS USING VIOLATIONS OF A REDUNDANT CODE USED FOR TRANSMITTING DIGITAL SIGNALS

[75] Inventor: Wayne D. Grover, Ottawa, Canada

[73] Assignee: Northern Telecom Limited, Montreal, Canada

[21] Appl. No.: 211,697

[22] Filed: Nov. 28, 1980

[51] Int. Cl.³ .............................................. H04J 3/06
[52] U.S. Cl. ............................. 370/119; 370/110.4; 370/11; 178/23 A; 178/69 G
[58] Field of Search .................. 370/110.4, 119, 83, 370/11, 84; 178/23 A, 69 G, 16, 71 T, 82 R, 82 A; 375/34

[56] References Cited

U.S. PATENT DOCUMENTS

| | | | |
|---|---|---|---|
| 3,475,723 | 10/1969 | Burton et al. | 375/34 |
| 3,764,987 | 10/1973 | Schulze | 370/119 |
| 3,787,613 | 1/1974 | Farmer et al. | 370/11 |
| 4,101,739 | 7/1978 | Mueller | 370/83 |
| 4,131,761 | 12/1978 | Giusto | 179/15 BY |
| 4,215,245 | 7/1980 | Bellisio | 370/84 |

*Primary Examiner*—Marshall M. Curtis
*Attorney, Agent, or Firm*—R. J. Haley

[57] ABSTRACT

At a transmitter of a digital transmission system which uses a redundant transmission code to transmit data, at least one predetermined code combination which occurs randomly in the encoded data is selectively modified, to form a predetermined code violation, in dependence upon an additional signal which is to be transmitted. At a receiver, the predetermined code violation is detected and corrected to reproduce the additional signal and the data. By selection of appropriate code combinations and violations more than one additional signal can be transmitted. The arrangement is particularly suitable for transmission of additional signals, which may comprise protection switching signals or a digital voice channel signal, via fiber optic transmission links using 2AMI encoding.

18 Claims, 4 Drawing Figures

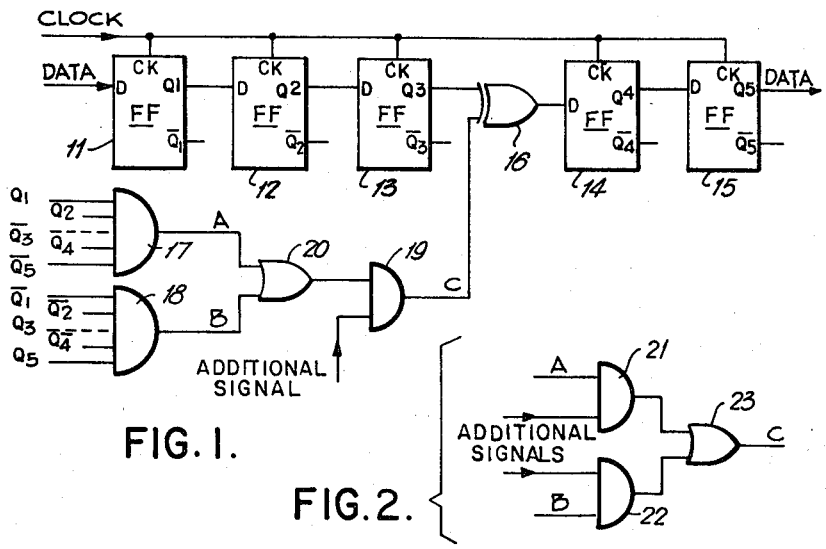
FIG. 1.
FIG. 2.
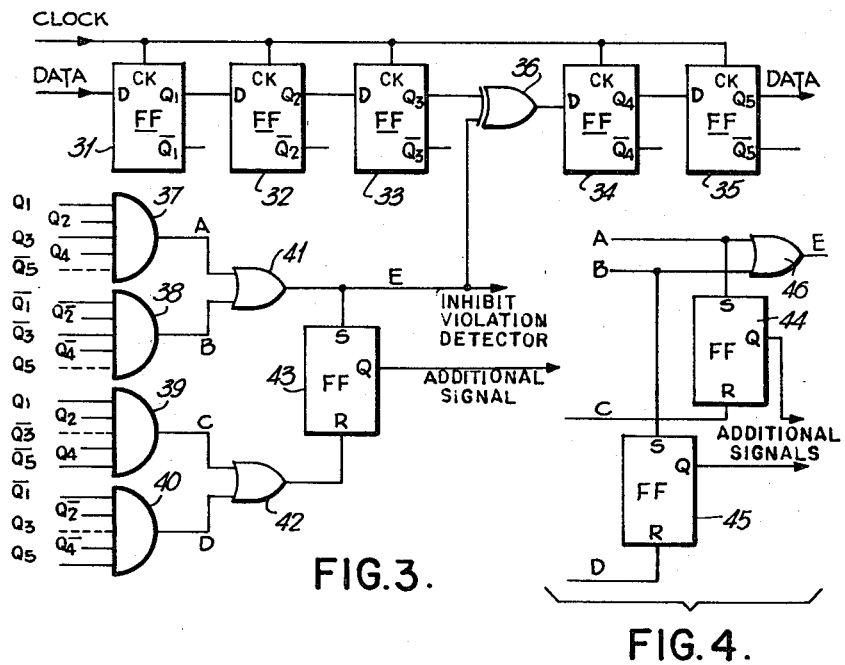
FIG. 3.
FIG. 4.

TRANSMITTING ADDITIONAL SIGNALS USING VIOLATIONS OF A REDUNDANT CODE USED FOR TRANSMITTING DIGITAL SIGNALS

This invention relates to a method of transmitting an additional signal via a transmission link which is already used to transmit a digital signal using a redundant transmission code, and to a transmission system embodying the method.

It is commonly required to transmit an additional signal via a digital signal transmission link, for example for protection switch signalling, remote alarm reporting, and providing a voice channel. It is known to transmit the additional signal via a separate transmission link, but this involves the disadvantage of providing such a separate link. Alternatively, additional bits corresponding to the additional signal can be transmitted with the digital signal via the transmission link, but this involves the provision of substantial extra circuitry and results in an increase of the transmitted bit rate, both of which are disadvantageous. Furthermore, it is known to modify predetermined bits of the digital signal in dependence upon the additional signal, but again this requires substantial additional circuitry and results in degradation of the transmitted digital signal.

An object of this invention, therefore, is to provide a method of transmitting an additional signal by means of which these disadvantages of the prior art are largely or entirely avoided.

According to one aspect of this invention there is provided a method of transmitting an additional signal via a transmission link via which a digital signal is transmitted from a transmitter to a receiver using a redundant transmission code, comprising: at the transmitter, in dependence upon said additional signal, selectively modifying a predetermined code combination, which occurs randomly in the encoded digital signal, to produce a predetermined code violation, and transmitting the encoded selectively modified digital signal; and at the receiver, detecting and correcting each such predetermined code violation to reproduce said additional signal and said digital signal.

According to another aspect of this invention there is provided a method of transmitting an additional signal via a transmission link via which a digital signal is transmitted from a transmitter to a receiver using a redundant transmission code, comprising: at the transmitter, in dependence upon said additional signal, selectively modifying each of two predetermined complementary code combinations, each of which occurs randomly in the encoded digital signal, to produce respective predetermined complementary code violations, and transmitting the encoded selectively modified digital signal; and at the receiver, detecting and correcting each of said predetermined code violations to reproduce said additional signal and said digital signal.

Thus in the present invention at least one randomly occurring code combination is effectively modulated, by modifying it to a code violation or leaving it unmodified, by the additional signal which is to be transmitted. Thus part of the existing redundancy of the transmission code is made use of to transmit the additional signal, and there is no increase in bit rate or requirement for complicated circuitry or a separate transmission link. Furthermore, there is very little degradation of the quality of the transmitted digital signal.

At the receiver, demodulation is effected by detecting and correcting each predetermined code violation that occurs. If the receiver includes a separate code violation detector, this can be supplied with the corrected encoded digital signal, or its violation-indicating output can be inhibited for each predetermined code violation. Alternatively, the code violation detector and circuitry for detecting and correcting the predetermined code violation(s) can be combined with one another. The occurrence of each predetermined code violation, and the absence of such an occurrence for a predetermined length of time, correspond to two states of the additional signal. The predetermined length of time is dependent upon the statistical probability of the occurrence of the predetermined code combination(s) in the encoded digital signal, and hence is dependent upon the code combination(s) selected and upon the nature of the digital signal. Instead of relying on the absence of an occurrence of the predetermined code violation(s) to determine one of the states of the additional signal, this can be determined by detecting the unmodified predetermined code combination(s) in the received signal.

It is particularly convenient if only one bit of the predetermined code combination need be changed to produce the predetermined code violation.

The particular forms of the predetermined code combination(s) and code violation(s) are dependent upon the particular transmission code which is used. Any one of a variety of redundant transmission codes, such as 2AMI and similar 1B2B codes, CMI, 2B3B, and 3B4B, may be used. Because 2AMI is increasingly being used as a transmission code, in particular for transmission of digital signals via fiber optic systems in telephony, the application of the invention to this code is described in detail below. However, it should be appreciated that the invention is similarly applicable to other redundant transmission codes.

2AMI (2-level alternate mark inversion) encoding is particularly suited to fiber optic digital transmission systems because the redundancy of the code permits simple detection of code violations, the encoded signal has adequate timing energy for signal regeneration, simple encoding and decoding circuitry can be used, and there is negligible low frequency content in the encoded signal spectrum. 2AMI encoding is effected in accordance with the following table:

| Bipolar (AMI) Signal | 2AMI Signal Sequence |
| --- | --- |
| + | 1 1 |
| − | 0 0 |
| 0 | 0 1 if previous bit was 1 |
|   | 1 0 if previous bit was 0 |

As will be appreciated from this table, a 2AMI encoded signal has twice the bit rate of a bipolar signal from which it can be derived, but this doubling of the bit rate presents no problem in low and medium capacity optic fiber transmission systems. A code violation of the 2AMI code is constituted by three consecutive similar bits, i.e. 111 or 000, this being used as a criterion for operation of a code violation detector of a transmission system using 2AMI encoding. In order that such simple code violation detection can be maintained, with 2AMI encoding preferably the or each predetermined code combination comprises a predetermined sequence of at least four bits.

The selection of the predetermined code combination(s) and code violation(s) which are used is dependent upon the transmission code, error monitoring requirements, and other factors, and is best illustrated by the following example for 2AMI encoding in which each code combination comprises a four bit sequence in which one bit is changed to produce the code violation. The following table shows the various possible code combinations (excluding those which are themselves code violations) and the corresponding code violations.

| | Code Combination | Code Violation |
|---|---|---|
| 1. | 0010 | 0000 |
| 2. | 0100 | |
| 3. | 0011 | 0001 |
| 4. | 0101 | |
| 5. | 1001 | |
| 6. | 0011 | 0111 |
| 7. | 0101 | |
| 8. | 0110 | |
| 9. | 1001 | 1000 |
| 10. | 1010 | |
| 11. | 1100 | |
| 12. | 0110 | 1110 |
| 13. | 1010 | |
| 14. | 1100 | |
| 15. | 1011 | 1111 |
| 16. | 1101 | |

The selections in lines 1, 4, 13, and 16 of this table are not desirable if simple unframed modification and detection circuitry is used, because they can lead to multiple modifications. For example, in the case of line 1 the valid 2AMI sequence ... 001010 ... could be modified to ... 000010 ... which contains a false (i.e. not originally occurring) sequence 0010, resulting in further modification to ... 000000 .... Similarly, in the case of line 4 the valid 2AMI sequence ... 010101 ... could be modified to ... 000101 ... and then further modified to ... 000001 .... Similar comments apply in respect of lines 13 and 16. Such undesired further modifications can, however, be avoided by using framing techniques.

The code combinations in lines 7 and 10 are undesirable because they correspond to the bipolar sequence 00. Because 2AMI encodes all bits in a bipolar sequence of zeros with the same code word, using either of these combinations could produce large peak disparities in the modified code, especially in low mark density situations.

The code combinations in lines 3, 5, 6, 8, 9, 11, 12, and 14 can be used singly, but complementary code combinations and violations, such as in lines 8 and 9 for example, can not be used together because they can interfere with the detection and modification of one another. The use of two complementary code combinations and corresponding code violations is advantageous because a greater number of modifications can be effected and because there is generally less increase of the low frequency content of the transmitted signal than in the case of one-bit modification of a single code combination. Furthermore, the use of two complementary code combinations facilitates the separate transmission of two additional signals, as described further below.

For the various reasons discussed above, the preferred 4-bit code combinations for 2AMI encoding, without using framing techniques, are those in lines 2 and 15 of the above table, i.e. 0100 modifiable to 0000, and 1011 modifiable to 1111.

A problem with these preferred code combinations can arise in cases where the 2AMI code is produced from a zero-substituted signal, for example a B6ZS encoded signal. In such a signal, a sequence of six zeros is replaced by a sequence 0VB0VB, where V is a violation and B is a + or − bit. For example, the bipolar sequence +000000 would be encoded in B6ZS encoding as +0+−0−+, which when encoded with 2AMI encoding results in the sequence 11011100100011, which contains both of the code combinations 0100 and 1011. If these code combinations were modified, the resulting sequence would be 11111100000011, which is not readily detectable at the receiver to produce the original bipolar sequence. In order to avoid this problem, it is convenient to use as the predetermined code combinations the sequences 0100 and 1011 each with an initial qualifying bit, 1 and 0 respectively. Thus the predetermined code combinations become the five-bit sequences 10100 and 01011, neither of which occurs in a 2AMI sequence which is derived from a zero sequence in a B6ZS signal.

The particular choice of the predetermined code combination(s) predominantly determines the rate at which these will occur in the encoded digital signal, and hence determines the signalling speed which is available for transmission of the additional signal. In a fiber optic transmission system in which the digital signal is a 12.624 Mb/s 2AMI encoded signal, derived from a 6.312 Mb/s bipolar signal which may comprise 96 64 kb/s digital voice channels, with the predetermined code combinations discussed above the signalling speed available for the transmission of the additional signal can be at least 64 kb/s with adequate accuracy, so that the additional signal can itself comprise a digital voice channel signal provided, for example, for maintenance purposes.

According to another aspect, this invention provides a digital transmission system in which data is transmitted from a transmitter to a receiver using a redundant transmission code, comprising: at the transmitter, means responsive to a signal to selectively modify a predetermined code combination, which occurs randomly in the encoded data, to produce a predetermined code violation, the encoded selectively modified data being transmitted; and at the receiver, means for detecting and correcting such predetermined code violations to reproduce said signal and said data. At each of the transmitter and the receiver, the relevant means can conveniently comprise a shift register together with logic means such as gating circuitry or a programmable read only memory (PROM).

The invention will be further understood from the following description with reference to the accompanying drawings, in which:

FIG. 1 illustrates an arrangement which is provided at a transmitter of a 2AMI data transmission system for inserting an additional signal into the 2AMI data stream for transmission;

FIG. 2 illustrates a modification of the arrangement of FIG. 1 for transmitting two additional signals individually via the data stream;

FIG. 3 illustrates an arrangement which is provided at a receiver of the transmission system for extracting the additional signal, inserted by the arrangement of FIG. 1, from the data stream and for correcting the data stream; and FIG. 4 illustrates a modification of an arrangement of FIG. 3 for extracting the two additional signals inserted in the data stream by the modification of FIG. 2.

The arrangement illustrated in FIG. 1 comprises five D flip-flops 11 to 15, an Exclusive-OR gate 16, AND gates 17, 18, and 19, and an OR gate 20. The flip-flops 11 to 15 are coupled in series, directly and via the gate 16 as shown, to form a shift register via which a 2AMI data stream is passed. For example, the shift register is provided in the data path from a bipolar-to-2AMI encoder to an optical transmitter for transmitting the 2AMI data via a fiber optic transmission link. Accordingly all of the flip-flops 11 to 15 are clocked via their clock inputs CK with a clock signal at the data bit rate, for example 12.624 MHz, the 2AMI data being supplied to a D input of the flip-flop 11 and the data output being derived from the Q output, Q5, of the flip-flop 15. No framing of the data is involved in this arrangement.

The inputs of the gates 17 and 18 are coupled as shown to the outputs Q1, Q1, . . . Q5 of the flip-flops 11 to 15, and their outputs are connected to the inputs of the OR gate 20. Accordingly, the output of the OR gate 20 is a logic 1 whenever the bits of the data stream contained in the shift register have the sequence 01011 or the sequence 10100. When the OR gate output is a logic 1 the AND gate 19 is enabled to supply the binary additional signal to an input of the gate 16, which couples the Q output of the flip-flop 13 to the D input of the flip-flop 14. Consequently, if the additional signal is a logic 1 each 2AMI data bit sequence 01011 is changed to 01111 and each 2AMI data bit sequence 10100 is changed to 10000, the modified sequences being transmitted. If the additional signal is a logic 0 these sequences are unchanged. Similarly, other bit sequences of the 2AMI data are unchanged. The modification shown in FIG. 2, in which lines marked A, B, and C correspond to similarly marked lines in FIG. 1 so that the AND gates 21 and 22 and the OR gate 23 of FIG. 2 are used to replace the gates 19 and 20 of FIG. 1, enables the transmission of two individual additional signals instead of only one as in FIG. 1. Thus with the modification of FIG. 2, the data sequence 01011 is selectively modified to 01111 in dependence upon one additional signal, and the data sequence 10100 is selectively modified to 10000 in dependence upon the other additional signal, the two selective modifications taking place completely independently of one another.

FIG. 3 illustrates an arrangement, provided at a receiver for example following a timing and data recovery circuit and preceding a 2AMI-to-bipolar decoder including a code violation detector, for extracting the additional signal inserted by the arrangement of FIG. 1 and for correcting the 2AMI data stream. As in FIG. 1, the arrangement of FIG. 3 comprises D flip-flops 31 to 35 forming a shift register through which the 2AMI data stream is clocked. The arrangement also comprises an Exclusive-OR gate 36, AND gates 37 to 40, OR gates 41 and 42, and a flip-flop 43 having a set input S and a reset input R.

The gates 37 and 38 have their inputs connected to outputs of the flip-flops 31 to 35 as shown, and have their outputs connected to inputs of the OR gate 41. Accordingly, the output of the gate 41 is a logic 1 whenever the bits of the received data stream contained in the shift register have the sequence 01111 or 10000, these sequences being produced by modification of the original data stream as described above with reference to FIG. 1. The output of the gate 41 is connected to the set input of the flip-flop 43 and to an input of the gate 36, which couples the Q output of the flip-flop 33 to the D input of the flip-flop 34. Accordingly, a logic 1 at the output of the gate 41 sets the flip-flop 43, which consequently reproduces the additional signal as a logic 1 at its output, and via the gate 36 changes the relevant data sequence back to its original form, 01011 or 10100. The output of the gate 41 may also be used as indicated to inhibit a code violation output signal of a code violation detector.

In the same manner as described above for the gates 17, 18, and 20 of FIG. 1, the gates 39, 40, and 42 in FIG. 3 serve to supply a logic 1 to the reset input of the flip-flop 43, to reproduce the logic 0 value of the additional signal at its Q output, whenever the unmodified sequence 01011 or the unmodified sequence 10100 occurs in the data bits in the shift register formed by the flip-flops 31 to 35. Thus the additional signal and the original data are reproduced at the Q outputs of the flip-flops 43 and 35 respectively.

The modification shown in FIG. 4, in which lines marked A to E correspond to similarly marked lines in FIG. 3 so that the flip-flops 44 and 45 and the OR gate 46 of FIG. 4 are used to replace the gates 41 and 42 and the flip-flop 43 of FIG. 3, enables reproduction of the two additional signals inserted by the arrangement of FIG. 2. Thus the flip-flop 44 is set and reset by the gates 37 and 39 in response to the data sequences 01111 and 01011 respectively to reproduce at its Q output the additional signal supplied to the gate 21 in FIG. 2, and the flip-flop 45 is set and reset in response to the data sequences 10000 and 10100 respectively to reproduce at its Q output the additional signal supplied to the gate 22 in FIG. 2. The gate 46 produces a logic 1 in response to the sequences 01111 and 10000 to inhibit a code violation detector and via the gate 36 to correct the sequences to 01011 and 10100 respectively in the same manner as the gate 41 in FIG. 3.

Although particular embodiments of the invention have been described in detail, it should be appreciated that many modifications, adaptations, and variations thereof may be made without departing from the scope of the invention as defined in the claims.

For example, FIGS. 1 and 3 illustrate in broken lines inputs to the gates 17, 18, and 37 to 40 which may be omitted. The flip-flops 15 and 35 and the corresponding AND gate inputs can also be omitted if the 2AMI data is produced from data which is not B6ZS encoded. Additional stages of the shift registers may be provided in order to improve the reliability of encoding and decoding the additional signal(s), and/or specific bit sequences in the data may be detected in association with the sequences which are actually modified in order to facilitate transmission of more than two additional signals, different additional signals being identified by different specific bit sequences. Alternatively, a single additional signal can be transmitted using only one of the sequences 01011 and 10100, with consequent simplification of the gating circuitry illustrated. The circuitry at the receiver can also be simplified by replacing each flip-flop 43, 44, or 45 by a retriggerable monostable circuit, for example, which is triggered repetitively to indicate one state of the relevant additional signal and, in the absence of such repetitive triggering, times out after a predetermined period to indicate the other state of the additional signal. Obviously in this case the monostable circuit could be triggered upon detection of either the modified sequence (code violation) or the unmodified sequence. In such an arrangement the monostable circuit period is selected in dependence upon the expected lowest recurrent rate of the unmodified sequences in the data stream. The output of the monostable circuit can be filtered in a low pass filter to reproduce the additional signal; the filter removes the effects of spurious time-outs of the monostable circuit so that the monostable circuit period can be reduced.

Furthermore, the described arrangements using flip-flops and gates may be replaced by various other arrangements which perform an equivalent function. In particular the described arrangements can be replaced by arrangements each comprising a shift register and a programmable read-only memory (PROM). At the transmitter, the original data can be clocked into the shift register, parallel outputs of which are connected together with the additional signal(s) to inputs of the PROM, whose memory contents provide the selectively modified data stream at an output thereof. The arrangement at the receiver can similarly comprise a shift register into which the received data is clocked, parallel outputs of the shift register being connected to inputs of a PROM which is programmed to provide the corrected data stream and the additional signal(s) at outputs thereof. In this case the arrangement at the receiver can conveniently also incorporate a code violation detector by suitable programming of the PROM.

In addition to the above changes, it is again observed that the invention is not limited to the 2AMI code or to the specific code combinations referred to above, but is also applicable to other code combinations and to other redundant transmission codes.

What is claimed is:

1. A method of transmitting an additional signal via a transmission link via which a digital signal is transmitted from a transmitter to a receiver using a redundant transmission code, comprising:
   at the transmitter, in dependence upon said additional signal, selectively modifying a predetermined code combination, which occurs randomly in the encoded digital signal, to produce a predetermined code violation, and transmitting the encoded selectively modified digital signal; and
   at the receiver, detecting and correcting each such predetermined code violation to reproduce said additional signal and said digital signal.

2. A method as claimed in claim 1 wherein the step of reproducing said additional signal at the receiver includes detecting each unmodified predetermined code combination.

3. A method as claimed in claim 1 or 2 wherein the modification of said predetermined code combination to produce said predetermined code violation comprises changing only one bit of said predetermined code combination.

4. A method as claimed in claim 1 or 2 wherein said transmission code is 2AMI and said predetermined code combination comprises a predetermined sequence of at least four bits.

5. A method as claimed in claim 1 or 2 wherein said transmission code is 2AMI and said predetermined code combination and said predetermined code violation comprise the bit sequences 1011 and 1111 respectively, or the bit sequences 0100 and 0000 respectively.

6. A method as claimed in claim 1 or 2 wherein said transmission code is 2AMI produced from a zero-substituted signal, and said predetermined code combination and said predetermined code violation comprise the bit sequences 01011 and 01111 respectively, or the bit sequences 10100 and 10000 respectively.

7. A method as claimed in claim 1 or 2 wherein said additional signal comprises a digital voice channel signal.

8. A method of transmitting an additional signal via a transmission link via which a digital signal is transmitted from a transmitter to a receiver using a redundant transmission code, comprising:
   at the transmitter, in dependence upon said additional signal, selectively modifying each of two predetermined complementary code combinations, each of which occurs randomly in the encoded digital signal, to produce respective predetermined complementary code violations, and transmitting the encoded selectively modified digital signal; and
   at the receiver, detecting and correcting each of said predetermined code violations to reproduce said additional signal and said digital signal.

9. A method as claimed in claim 8 wherein the step of reproducing said additional signal at the receiver includes detecting each unmodified predetermined code combination.

10. A method as claimed in claim 8 or 9 wherein the modification of each of said predetermined code combinations to produce the respective predetermined code violation comprises changing only one bit of the relevant predetermined code combination.

11. A method as claimed in claim 8 or 9 wherein said transmission code is 2AMI and each of said predetermined code combinations comprises a predetermined sequence of at least four bits.

12. A method as claimed in claim 8 or 9 wherein said transmission code is 2AMI, said predetermined complementary code combinations comprise the bit sequences 1011 and 0100, and said predetermined complementary code violations comprise the bit sequences 1111 and 0000.

13. A method as claimed in claim 8 or 9 wherein said transmission code is 2AMI produced from a zero-substituted signal, said predetermined complementary code combinations comprise the bit sequences 01011 and 10100, and said predetermined complementary code violations comprise the bit sequences 01111 and 10000.

14. A method as claimed in claim 8 or 9 wherein said additional signal comprises a digital voice channel signal.

15. A digital transmission system in which data is transmitted from a transmitter to a receiver using a redundant transmission code, comprising:
   at the transmitter, means responsive to a signal to selectively modify a predetermined code combination, which occurs randomly in the encoded data, to produce a predetermined code violation, the encoded selectively modified data transmitted; and
   at the receiver, means for detecting and correcting such predetermined code violations to reproduce said signal and said data.

16. A system as claimed in claim 15 wherein said means at the transmitter comprises a shift register into which the encoded data is shifted, and logic means responsive to the predetermined code combination being present in the shift register to produce said predetermined code violation selectively in dependence upon said signal.

17. A system as claimed in claim 15 wherein said means at the receiver comprises a shift register into which the received data is shifted, and logic means responsive to at least one of the predetermined code violation and the predetermined code combination being present in the shift register to reproduce said signal.

18. A system as claimed in claim 17 wherein said logic means comprises a bistable stage arranged to be set to a first state in response to the predetermined code violation being present in the shift register and to be set to a second state in response to the predetermined code combination being present in the shift register, said signal being reproduced at an output of the bistable stage.

* * * * *